US012243272B2

(12) United States Patent
Kaneko

(10) Patent No.: US 12,243,272 B2
(45) Date of Patent: Mar. 4, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazue Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 17/701,502

(22) Filed: Mar. 22, 2022

(65) Prior Publication Data

US 2022/0309713 A1 Sep. 29, 2022

(30) Foreign Application Priority Data

Mar. 26, 2021 (JP) ................................. 2021-053208
Sep. 17, 2021 (JP) ................................. 2021-152320

(51) Int. Cl.
*G06T 7/90* (2017.01)
*G06V 10/56* (2022.01)
*G06V 40/16* (2022.01)

(52) U.S. Cl.
CPC .............. *G06T 7/90* (2017.01); *G06V 10/56* (2022.01); *G06V 40/164* (2022.01); *G06V 40/165* (2022.01); *G06V 40/166* (2022.01); *G06T 2207/30201* (2013.01)

(58) Field of Classification Search
CPC ... G06T 7/90; G06T 2207/30201; G06T 7/11; G06T 7/0012; G06V 10/56; G06V 40/164; G06V 40/165; G06V 40/166; G06V 10/751; G06V 40/162; A61B 5/024; A61B 5/0077; A61B 5/1032; A61B 5/7221

See application file for complete search history.

(56) References Cited

U.S. PATENT DOCUMENTS

2012/0242501 A1* 9/2012 Tran ...................... A61B 5/0024
340/870.02
2013/0096439 A1* 4/2013 Lee ....................... A61B 5/7257
600/479
2015/0094914 A1* 4/2015 Abreu ................ B60H 1/00742
701/1

(Continued)

FOREIGN PATENT DOCUMENTS

JP            5153660 B2     2/2013
JP         2020102059 A     7/2020
WO       2016/064693 A1     4/2016

*Primary Examiner* — Chan S Park
*Assistant Examiner* — D J Dhooge
(74) *Attorney, Agent, or Firm* — Canon U.S.A., Inc., IP Division

(57) ABSTRACT

An appropriate skin color range can be promptly set. An image processing apparatus configured to estimate a pulse of a person detected from an image includes a setting unit configured to set an ellipse region including a face detected from the image, an acquisition unit configured to acquire color information about a pixel included in the set ellipse region, a determination unit configured to determine whether the acquired color information satisfies a predetermined condition, and a specifying unit configured to specify a threshold value indicating a skin color range based on the color information in the ellipse region in a case where the determination unit determines that the acquired color information satisfies the predetermined condition.

19 Claims, 18 Drawing Sheets

(56) References Cited

U.S. PATENT DOCUMENTS

| | | | |
|---|---|---|---|
| 2015/0261996 A1* | 9/2015 | Kim ...................... | G06T 7/0012 |
| | | | 348/14.03 |
| 2017/0238842 A1* | 8/2017 | Jacquel ................ | A61B 5/0205 |
| 2018/0068171 A1* | 3/2018 | Jones ................... | G06V 40/168 |
| 2019/0175029 A1* | 6/2019 | Kumar ................. | A61B 5/7246 |
| 2021/0153752 A1* | 5/2021 | Park ..................... | A61B 5/0205 |

* cited by examiner

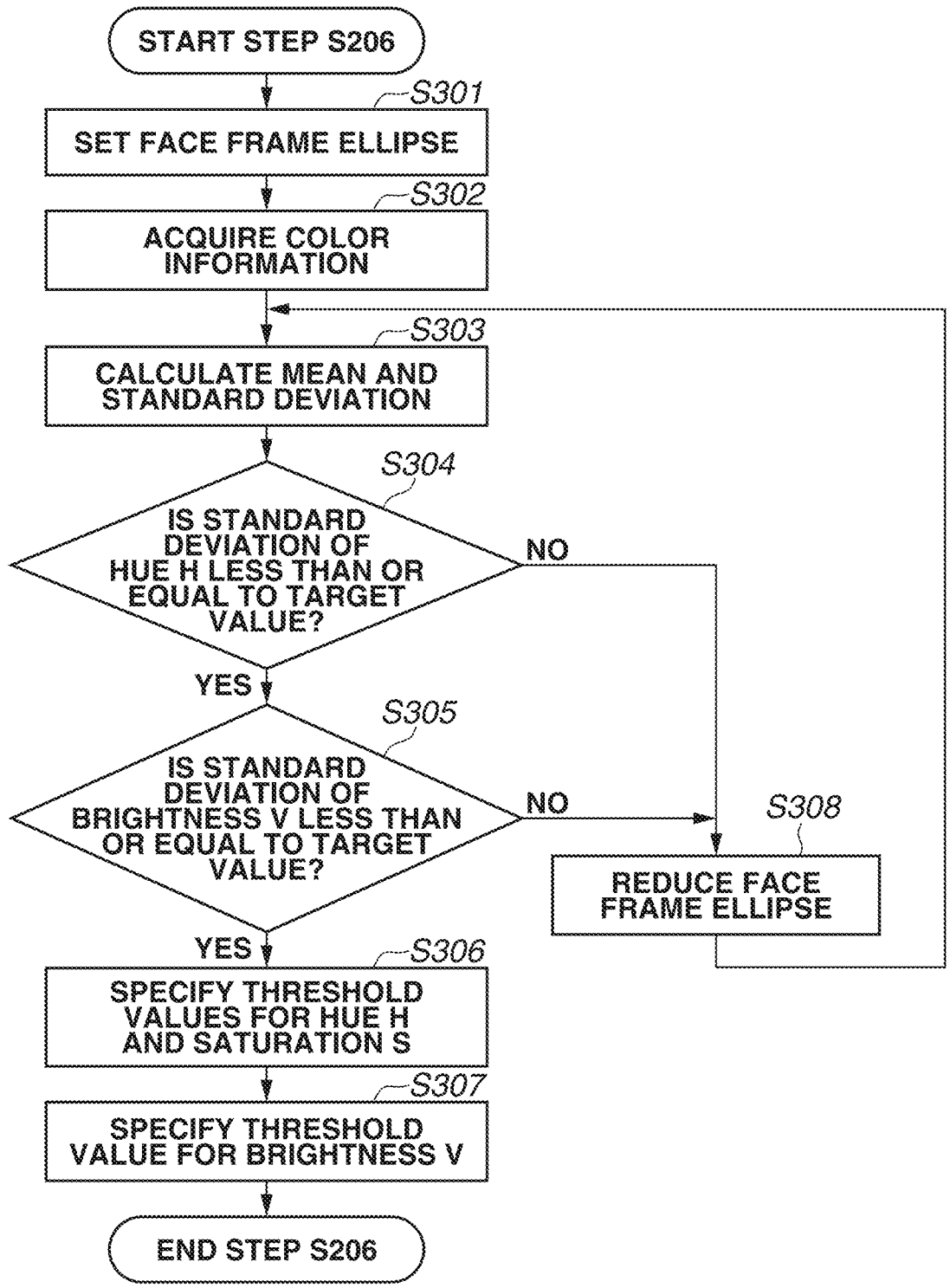

FIG.6

| ELLIPSE RATIO | TRACKING ID | STANDARD DEVIATION OF HUE H | STANDARD DEVIATION OF SATURATION S | STANDARD DEVIATION OF BRIGHTNESS V | MEAN OF HUE H | LOWER LIMIT OF HUE H | UPPER LIMIT OF HUE H | MEAN OF SATURATION S | LOWER LIMIT OF SATURATION S | UPPER LIMIT OF SATURATION S | MEAN OF BRIGHTNESS V | LOWER LIMIT OF BRIGHTNESS V | UPPER LIMIT OF BRIGHTNESS V |
|---|---|---|---|---|---|---|---|---|---|---|---|---|---|
| 0.85 | 402 | 18.898 | 25.944 | 38.450 | 15.177 | | | 97.672 | | | 114.571 | | |
| 0.80 | 402 | 12.442 | 22.503 | 36.687 | 15.613 | | | 98.782 | | | 116.419 | | |
| 0.79 | 402 | 11.671 | 21.810 | 36.345 | 15.673 | -8 | 39 | 98.906 | 55 | 143 | 116.894 | 88 | 250 |
| 0.85 | 403 | 24.700 | 29.735 | 59.298 | 18.708 | | | 90.798 | | | 107.715 | | |
| 0.75 | 403 | 19.085 | 25.485 | 55.503 | 16.883 | | | 95.271 | | | 117.660 | | |
| 0.73 | 403 | 16.800 | 24.487 | 54.303 | 16.733 | | | 95.962 | | | 120.084 | | |
| 0.70 | 403 | 11.977 | 22.665 | 51.367 | 16.512 | -7 | 40 | 96.330 | 51 | 142 | 124.769 | 88 | 250 |

FIG.11
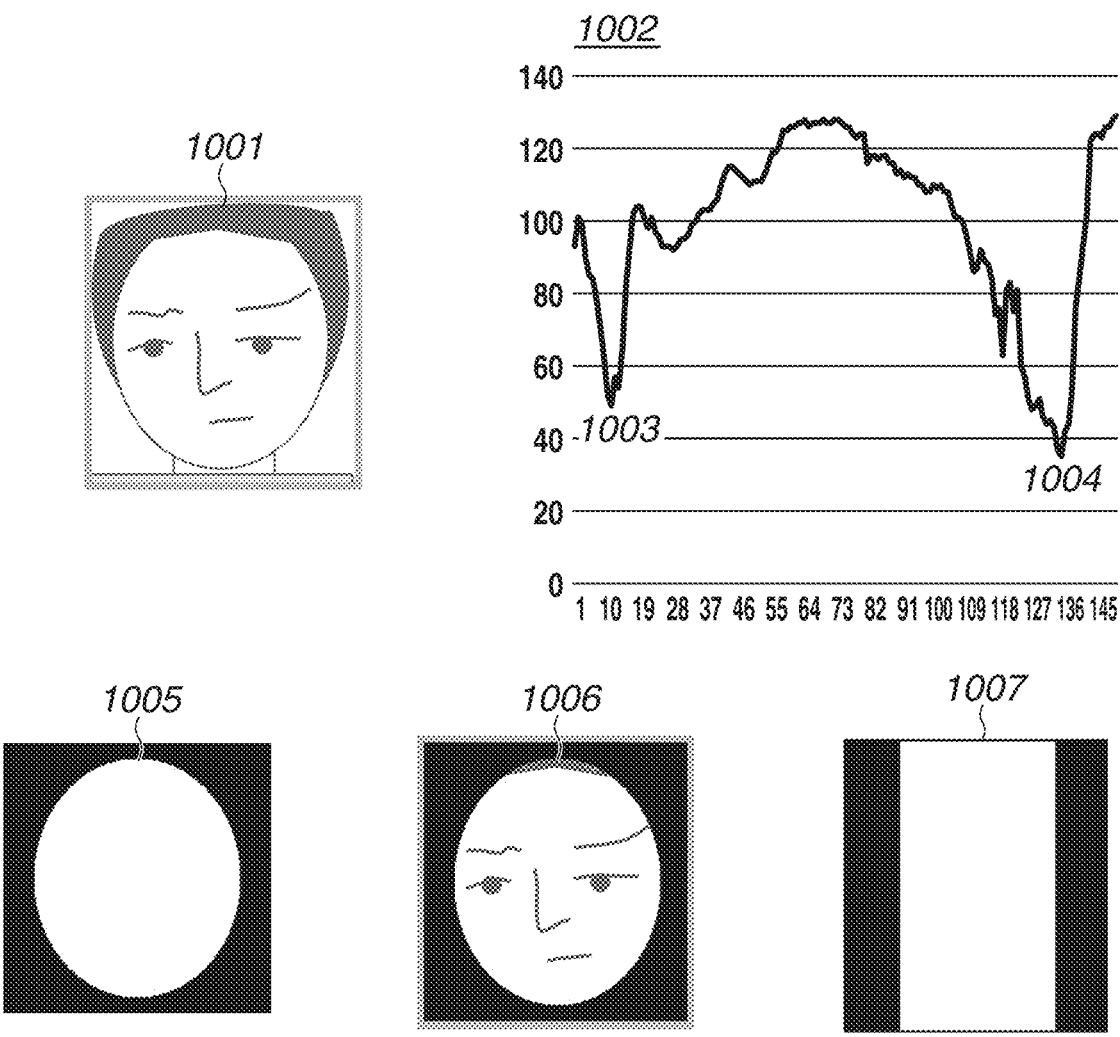
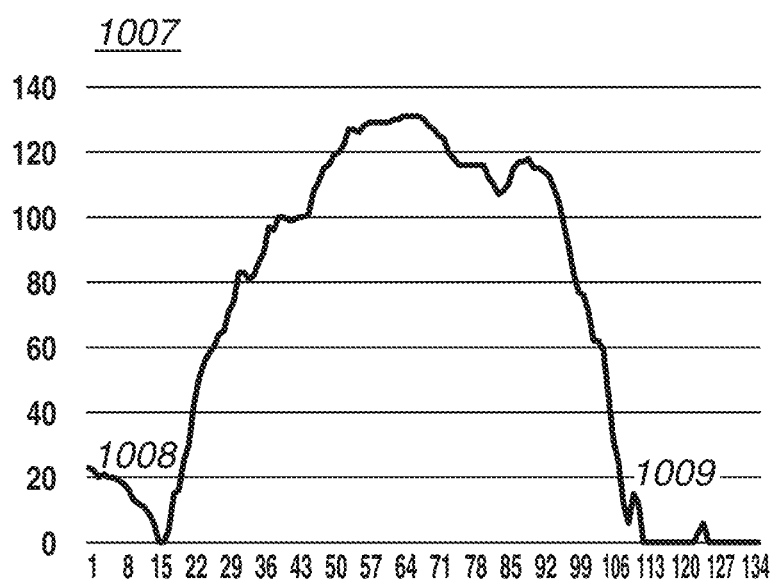

FIG.14A
| ELLIPSE RATIO | TRACKING ID | STANDARD DEVIATION OF HUE H | STANDARD DEVIATION OF SATURATION S | STANDARD DEVIATION OF BRIGHTNESS V | MEAN OF HUE H | LOWER LIMIT OF HUE H | UPPER LIMIT OF HUE H | MEAN OF SATURATION S | LOWER LIMIT OF SATURATION S | UPPER LIMIT OF SATURATION S | MEAN OF BRIGHTNESS V | LOWER LIMIT OF BRIGHTNESS V | UPPER LIMIT OF BRIGHTNESS V |
|---|---|---|---|---|---|---|---|---|---|---|---|---|---|
| 0.84 | 3 | 11.9086 | 51.5172 | 41.7822 | 3.2079 | -21 | 27 | 97.1995 | -6 | 200 | 157.045 | 131 | 250 |
| 0.84 | 3 | 11.9086 | 51.5172 | 41.7822 | 3.2079 | -21 | 27 | 97.1995 | 24 | 200 | 157.045 | 131 | 250 |
1401
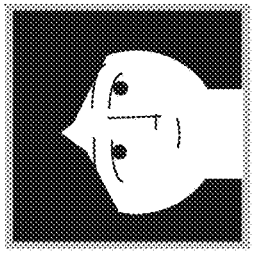
FIG.14B
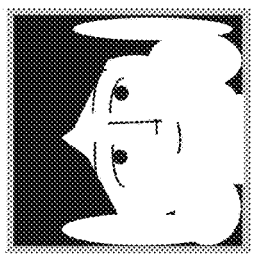
FIG.14C
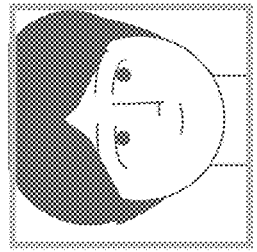
FIG.14D

FIG.16A

| ELLIPSE RATIO | TRACKING ID | STANDARD DEVIATION OF HUE H | STANDARD DEVIATION OF SATURATION S | STANDARD DEVIATION OF BRIGHTNESS V | MEAN OF HUE H | LOWER LIMIT OF HUE H | UPPER LIMIT OF HUE H | MEAN OF SATURATION S | LOWER LIMIT OF SATURATION S | UPPER LIMIT OF SATURATION S | MEAN OF BRIGHTNESS V | LOWER LIMIT OF BRIGHTNESS V | UPPER LIMIT OF BRIGHTNESS V | SKIN COLOR CONTENT PERCENTAGE | SKIN COLOR CONTENT PERCENTAGE (INSIDE) | SKIN COLOR CONTENT PERCENTAGE (OUTSIDE) | BACKGROUND MASK |
|---|---|---|---|---|---|---|---|---|---|---|---|---|---|---|---|---|---|
| 0.35 | 4 | 33.2531 | 26.2823 | 37.2922 | 14.3278 | −52 | 81 | 93.1087 | 41 | 146 | 90.261 | 67 | 250 | 55% | 64% | 40% |  |
| 0.35 | 4 | 14.4 | 24 | 37.2922 | 14.3278 | −14 | 43 | 93.1087 | 45 | 141 | 90.261 | 67 | 250 | 36% | 55% | 6% | UNSET |

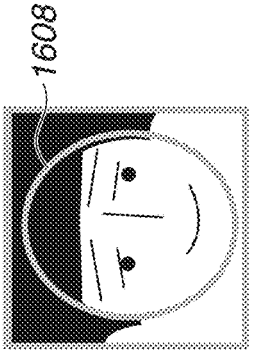

FIG.16B

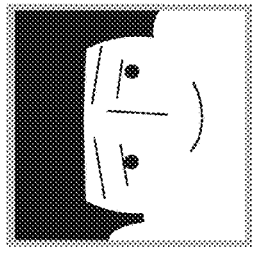

FIG.16C

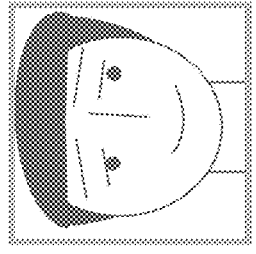

FIG.16D

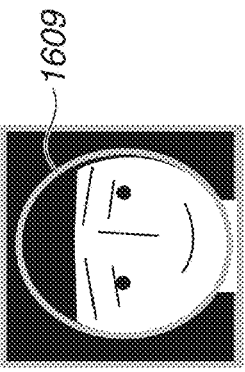

FIG.16E

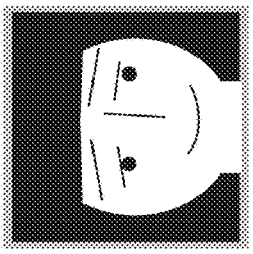

| ELLIPSE RATIO | TRACKING ID | STANDARD DEVIATION OF HUE H | STANDARD DEVIATION OF SATURATION S | STANDARD DEVIATION OF BRIGHTNESS V | MEAN OF HUE H | LOWER LIMIT OF HUE H | UPPER LIMIT OF HUE H | MEAN OF SATURATION S | LOWER LIMIT OF SATURATION S | UPPER LIMIT OF SATURATION S | MEAN OF BRIGHTNESS V | LOWER LIMIT OF BRIGHTNESS V | UPPER LIMIT OF BRIGHTNESS V | SKIN COLOR CONTENT PERCENTAGE | SKIN COLOR CONTENT PERCENTAGE (INSIDE) | SKIN COLOR CONTENT PERCENTAGE (OUTSIDE) | BACKGROUND MASK |
|---|---|---|---|---|---|---|---|---|---|---|---|---|---|---|---|---|---|
| 0.55 | 5 | 16.6832 | 25.9974 | 34.4103 | 22.4885 | −11 | 56 | 118.689 | 67 | 171 | 89.916 | 69 | 250 | 59% | 64% | 50% | |
| 0.55 | 5 | 14.4 | 24 | 34.4103 | 22.4885 | −6 | 51 | 118.689 | 71 | 167 | 89.916 | 69 | 250 | 50% | 61% | 32% | SET |

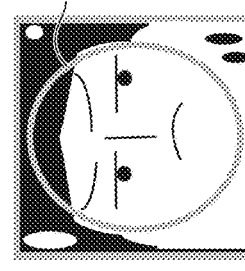

FIG.17B

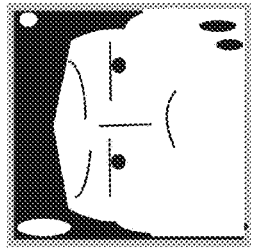

FIG.17C

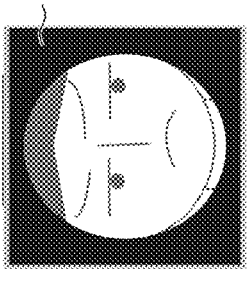

FIG.17D

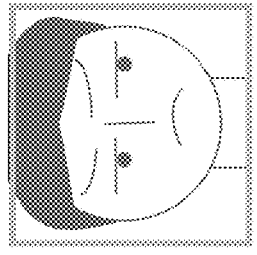

FIG.17E

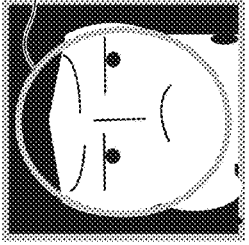

FIG.17F

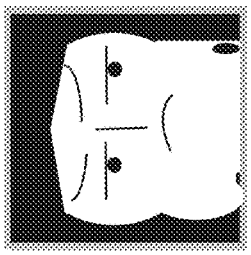

| ELLIPSE RATIO | TRACKING ID | STANDARD DEVIATION OF HUE H | STANDARD DEVIATION OF SATURATION S | STANDARD DEVIATION OF BRIGHTNESS V | MEAN OF HUE H | LOWER LIMIT OF HUE H | UPPER LIMIT OF HUE H | MEAN OF SATURATION S | LOWER LIMIT OF SATURATION S | UPPER LIMIT OF SATURATION S | MEAN OF BRIGHTNESS V | LOWER LIMIT OF BRIGHTNESS V | UPPER LIMIT OF BRIGHTNESS V | SKIN COLOR CONTENT PERCENTAGE | SKIN COLOR CONTENT PERCENTAGE (INSIDE) | SKIN COLOR CONTENT PERCENTAGE (OUTSIDE) | BACKGROUND MASK |
|---|---|---|---|---|---|---|---|---|---|---|---|---|---|---|---|---|---|
| 0.32 | 6 | 15.2742 | 38.8612 | 29.6954 | 49.2011 | 18 | 61 | 102.824 | 25 | 180 | 64.1103 | 46 | 250 | 35% | 50% | 12% | |
| 0.32 | 6 | 14.4 | 24 | 29.6954 | 49.2011 | 20 | 58 | 102.824 | 54 | 150 | 64.1103 | 46 | 250 | 32% | 47% | 8% | |
| 0.32 | 6 | 15.2742 | 38.8612 | 29.6954 | 49.2011 | 18 | 61 | 102.824 | 25 | 180 | 64.1103 | 46 | 250 | 35% | 50% | 12% | SET |

1801 1807 1808 1805
1804 1802 1806 1803

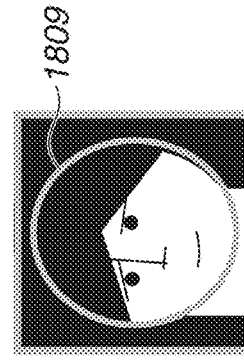

FIG.18B

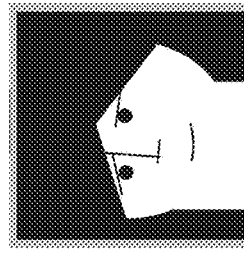

FIG.18C

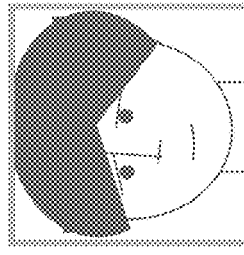
1809

FIG.18D

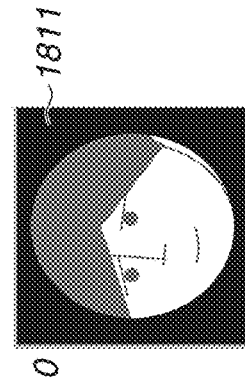

FIG.18E

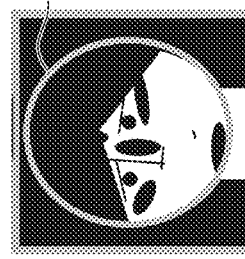
1810

FIG.18F

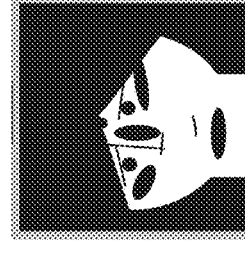
1811

FIG.18G

IMAGE PROCESSING APPARATUS, IMAGE PROCESSING METHOD, AND STORAGE MEDIUM

BACKGROUND OF THE INVENTION

Field of the Invention

The present invention relates to a technique for estimating pulse information from an image.

Description of the Related Art

There have been methods for acquiring pulse information from images in a predetermined illumination environment by cutting a partial region of a face, calculating a change in skin color in the region, and measuring a cycle of the change. According to Japanese Patent No. 5153660, a face is detected from an image, and a color histogram is generated from a region including the detected face. Then, a skin color range (values in a luma-blue-red (YUV), red-green-blue (RGB), or hue-saturation-brightness (HSV) color space) in the image is identified based on the histogram. Further, according to Japanese Patent Application Laid-Open Publication No. 2020-102059, face detection and skin color region detection are repeatedly performed on images while a skin color condition is eased, and a skin color range at a point when a ratio between the area of a face detection region and the area of a skin color region exceeds a predetermined value and when a face is detected is identified.

SUMMARY OF THE INVENTION

According to an aspect of the present invention, an image processing apparatus configured to estimate a pulse of a person detected from an image includes a setting unit configured to set an ellipse region including a face detected from the image, an acquisition unit configured to acquire color information about a pixel included in the set ellipse region, a determination unit configured to determine whether the acquired color information satisfies a predetermined condition, and a specifying unit configured to specify a threshold value indicating a skin color range based on the color information in the ellipse region in a case where the determination unit determines that the acquired color information satisfies the predetermined condition.

Further features of the present invention will become apparent from the following description of embodiments with reference to the attached drawings.

BRIEF DESCRIPTION OF THE DRAWINGS

FIG. 4 is a flowchart illustrating a process that is performed by the image processing apparatus.

FIG. 6 is a table illustrating an example of a skin color threshold value specifying table.

FIG. 11 is a diagram illustrating an example of a background mask.

FIGS. 14A to 14D are diagrams illustrating an example of saturation threshold value correction processing.

FIGS. 16A to 16F are diagrams illustrating an example of threshold value correction processing.

FIGS. 17A to 17G are diagrams illustrating an example of threshold value correction processing.

FIGS. 18A to 18G are diagrams illustrating an example of threshold value correction processing.

DESCRIPTION OF THE EMBODIMENTS

Various embodiments of the present invention will be described below with reference to the drawings.

There have been methods for acquiring pulse information from images in a predetermined illumination environment by cutting a partial region of a face, calculating a change in skin color in the region, and measuring a cycle of the change. The cutting of a portion of a face is often affected by an illumination direction or a face orientation. Thus, unless a subject position can be specified in advance using a monitoring camera, fluctuations in how a skin color appears need to be considered. Further, in a case where a fixed condition of a skin color of an entire face is preset, a portion deviating from the fixed values may appear due to an effect of variation between individuals, variation between cameras, or illumination color temperature. In a case where the deviating portion flickers over time, noise occurs in a change cycle of a target color. This makes it difficult to estimate a pulse accurately. A method for dynamically specifying a definition (RGB value range) of a skin color in an image to stabilize pulse estimation from images even in a situation where an imaging condition is unstable will be described below considering the above-described points.

Figure 1:
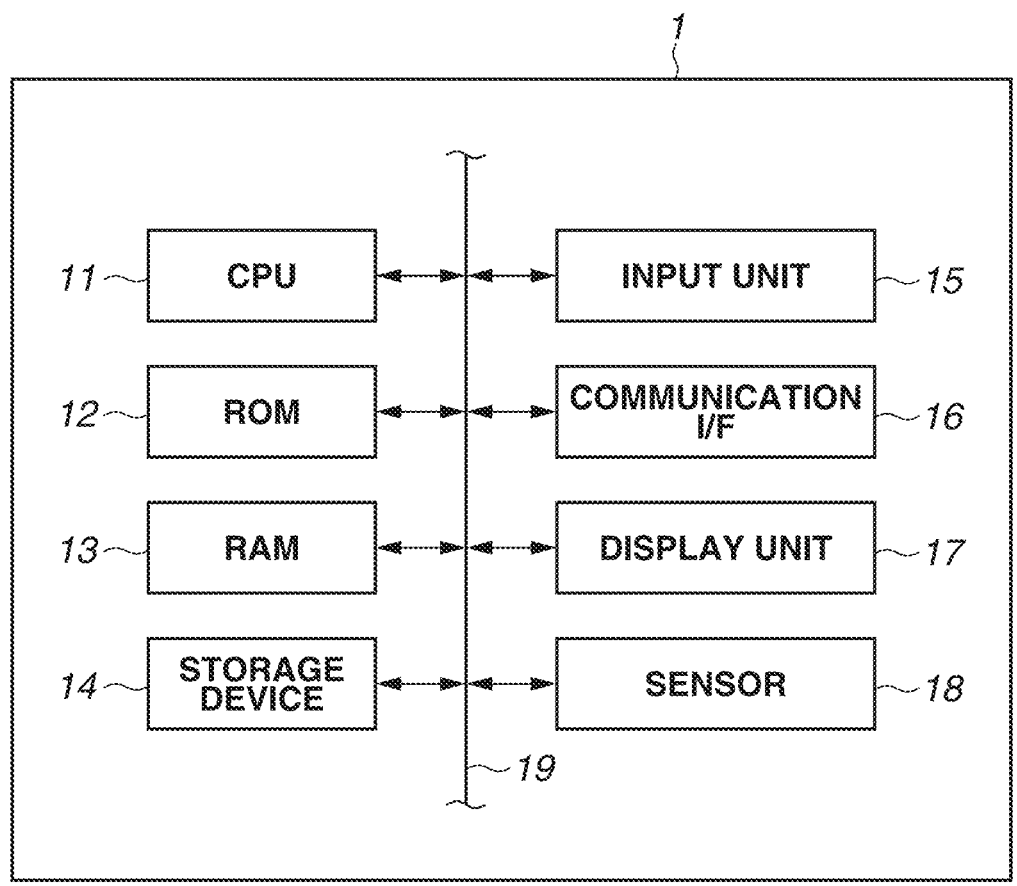
FIG. 1 is a block diagram illustrating an example of a hardware configuration of an image processing apparatus.

FIG. 1 is a block diagram illustrating an example of a hardware configuration of an image processing apparatus 1 according to a first embodiment. A central processing unit (CPU) 11 reads an operating system (OS) and other programs stored in a read-only memory (ROM) 12 or a storage device 14 and executes the read OS and programs using a random access memory (RAM) 13 as a work memory, controls components connected to a system bus 19, and performs computation and logical determination of various types of processing. The various types of processing performed by the CPU 11 include image processing according to the present embodiment. The storage device 14 is a hard disk drive or an external storage device and stores programs and various types of data for the image processing according to the present embodiment. An input unit 15 is an imaging apparatus such as a camera and an input device for inputting user instructions such as a button, a keyboard, and a touch panel. The storage device 14 is connected to the system bus 19 via an interface such as a serial advanced technology attachment (SATA), and the input unit 15 is connected to the system bus 19 via a serial bus such as a universal serial bus (USB). Detailed descriptions thereof are omitted. A communication interface (communication I/F) 16 communicates with external devices via wireless communication. A display unit 17 is a display. A sensor 18 is an image sensor or a distance sensor. Part of the foregoing hardware components of the image processing apparatus 1 can be omitted. For example, in a case where the image processing apparatus 1 is a network camera, the input device such as a keyboard and the display unit 17 are optional.

Figure 2:
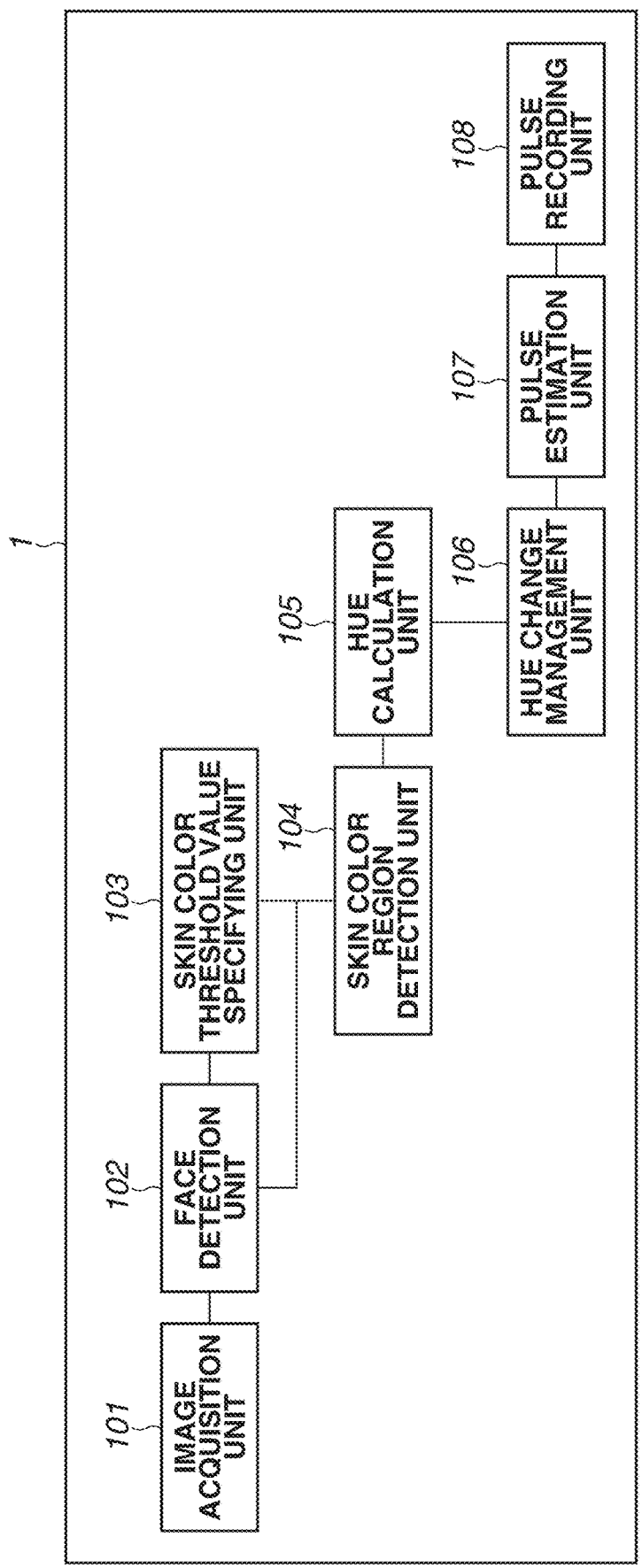
FIG. 2 is a block diagram illustrating an example of a functional configuration of the image processing apparatus.

FIG. 2 is a block diagram illustrating an example of a functional configuration of the image processing apparatus 1. The image processing apparatus 1 estimates a pulse of a person detected from an image. The image processing apparatus 1 includes an image acquisition unit 101, a face detection unit 102, a skin color threshold value specifying unit 103, a skin color region detection unit 104, a hue calculation unit 105, a hue change management unit 106, a pulse estimation unit 107, and a pulse recording unit 108. An imaging apparatus for acquiring images and/or an output device for displaying pulse estimation results can be connected as an external device.

The image acquisition unit 101 acquires a captured image of a target person. The image acquisition unit 101 can acquire, for example, an image captured by an imaging unit of the image processing apparatus 1 or an image from video images stored in a storage unit.

The face detection unit 102 detects a face from the acquired image. The face detection unit 102 can track a face by detecting the face from a plurality of frames. The face detection uses a known image recognition method. Specifically, the face detection can be performed using a face detector with a neural network trained with face images or can be performed by template matching of face images. Alternatively, a face image can be acquired by generating a screen for guiding a target person into a predetermined angle of view and extracting a face region from an image of the person captured in a frame of the screen. In any of the cases regardless of which method is used, a face size in the image needs to be greater than or equal to a predetermined size, but a face orientation and an illumination condition do not necessarily have to be predetermined. While the accuracy of pulse estimation can be increased in a case where the face orientation and the illumination condition are predetermined, the pulse estimation according to the present embodiment is still performed suitably even in a case where there is a change in the face orientation or the illumination condition.

The skin color threshold value specifying unit 103 specifies a threshold value (condition for color information to be extracted as a skin color) for a target color (skin color in the present embodiment) in the input video image based on color information about the face region. The skin color threshold value specifying unit 103 first sets an ellipse region including the face identified from the image. Next, the skin color threshold value specifying unit 103 acquires color information such as a hue from each pixel from the set ellipse region. The color information refers to a hue, a saturation, and a brightness. The skin color threshold value specifying unit 103 further determines whether the color information satisfies a predetermined condition based on statistical values of the acquired color information. The statistical values of the color information are mean values and standard deviations of the hues, the saturations, and the brightnesses. In a case where the statistical values of the color information in the set ellipse region satisfy the condition, the skin color threshold value specifying unit 103 specifies a threshold value for color information to be extracted as a skin color based on the color information. Details thereof will be described below. Since color information to be extracted as a skin color varies depending on the illumination condition on the video image or the skin color of the target person, specifying a skin color threshold value for each video image can facilitate robust pulse estimation with respect to the illumination condition, the face orientation, and personal features.

The skin color region detection unit 104 acquires a portion image (skin color region) for use in pulse estimation from the image based on the specified threshold value for the target color. Details thereof will be described below. The hue calculation unit 105 calculates a hue based on the specified color information about each pixel in the skin color region. The hue change management unit 106 calculates a change (frequency) in hue based on the hues calculated from the plurality of frames. The pulse estimation unit 107 estimates a pulse of the target person based on the calculated frequency of the hue. Estimating a pulse of a person from an image has an advantage that a health status of the person can be checked remotely. Details thereof will be described below. Processes of the functional units have been briefly described above.

Figure 3:
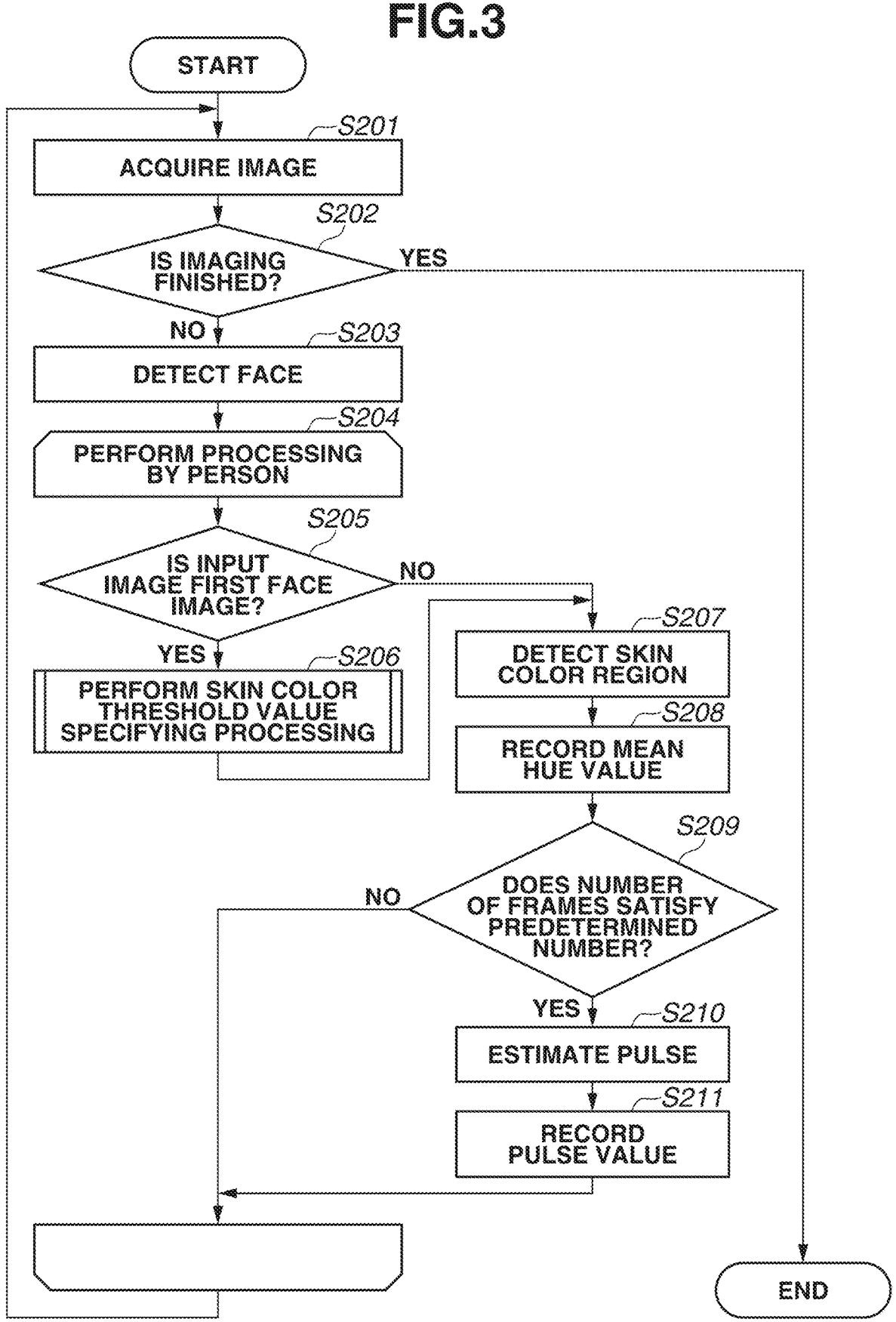
FIG. 3 is a flowchart illustrating a process that is performed by the image processing apparatus.

Next, a process that is performed by the functional units will be described below with reference to a flowchart illustrated in FIG. 3. Not all the steps in the flowchart necessarily have to be performed.

In step S201, the image acquisition unit 101 acquires an image of each frame from video images captured by the imaging apparatus. In step S202, the image acquisition unit 101 determines whether the imaging apparatus has finished imaging. In a case where the imaging is continued (NO in step S202), the processing proceeds to step S203. On the other hand, in a case where the imaging is finished (YES in step S202), the pulse estimation process ends. Whether to continue the process can be determined based on a user instruction. In the case where the imaging is continued, in step S203, the face detection unit 102 detects a face from the acquired images. Since the images of the plurality of frames are acquired, a face is detected from each of the images. In a case where an image includes a plurality of faces, the faces of the same person are associated together. In step S204, the face detection unit 102 specifies an image to be output to the next processing for each detected person. Steps S205 to S211 are performed on all the detected faces. In step S205, the skin color threshold value specifying unit 103 determines whether the input image is the first face image from which the target person is detected. In a case where the input image is the first face image (YES in step S205), the processing proceeds to step S206. In step S206, the skin color threshold value specifying unit 103 specifies a skin color threshold value, and the processing proceeds to step S207. Details of the processing of step S206 will be described below. On the other hand, in a case where the input image is not the first face image (NO in step S205), the processing proceeds directly to step S207. The determination can be performed using a different method for determining whether a skin color threshold value is specified for the target person. For example, the face detection unit 102 can perform face authentication against registered persons, and in a case where a registered person is detected and a skin color threshold value corresponding to the detected person is stored, the processing can proceed to step S207. Further, in a case where results of detection of a target person from a plurality of frames are acquired, an image for specifying a skin color threshold value can be acquired from a desired image. In this case, face detection is performed on each frame, and in a case where a previously undetected person is detected, the processing proceeds to step S206. On the other hand, in a case where a previously detected person is detected, it is determined that the image is not the first image based on corresponding tracking information, and the processing proceeds to step S207. The processing of step S207 will be described first, and the processing of step S206 will be described thereafter.

In step S207, the skin color region detection unit 104 extracts each pixel having color information indicating the skin color in the set face region as a skin color region using the skin color threshold value specified for each target person. At this time, a detected face frame (rectangular bounding box) is enlarged at a magnification of, for example, 1.5 so that the skin color region of the face fits in a detection target frame, and the skin color region detection is performed on all pixels in the frame.

In step S208, the hue calculation unit 105 calculates a mean hue value of the detected skin color region and records the calculated mean hue value. In step S209, the hue change management unit 106 determines whether the number of frames for which a mean hue value is recorded satisfies a predetermined number. In a case where the number of frames satisfies the predetermined number (YES in step S209), the processing proceeds to step S210. In step S210, the pulse estimation unit 107 performs pulse estimation using a change in the mean hue values. In step S211, the pulse recording unit 108 records a pulse value. After the pulse estimation on one person is completed, the processing returns to step S204, and the pulse estimation is performed on a next person. After the pulse estimation on all the detected face tracking ends, the processing proceeds to step S201, and the processing on a next image is continued.

There are various pulse estimation methods such as a method by calculating a moving average of intervals between peaks, a method by performing frequency spectrum analysis, and a method by performing principal component analysis, and the present invention is not limited to a particular pulse estimation method.

Further, while a skin color threshold value is specified only for the first face image of the tracking in the above-described example, a skin color threshold value can also be specified for an image during the tracking in a case where the image satisfies a predetermined condition. For example, a threshold value can be specified using a point when the skin color region has a maximum size as a reference. Alternatively, a point when a tracking target moves through a predetermined distance, a point when a value of a change in hue reaches or exceeds a predetermined value, or a point when a face orientation is changed in a case where a face orientation detection unit is added can be used. Further, while face tracking is performed in the above-described example, entire-body tracking can be performed, and persons having the same tracking identification (tracking ID) can be determined as the same person. In a case where a person is determined as the same person by entire-body tracking although the face of the person is not captured, the skin color threshold value does not have to be changed at the next time when the face is captured.

Figure 5A:
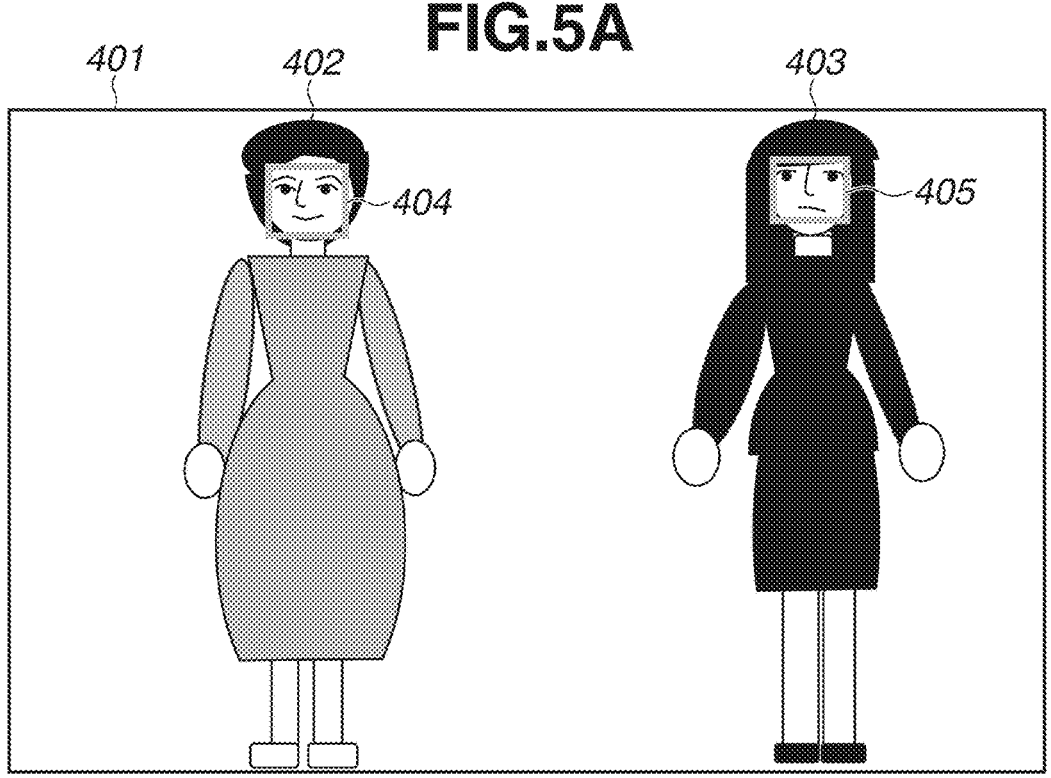
FIGS. 5A to 5C are diagrams illustrating an example of a processing target image.
Figure 5B:
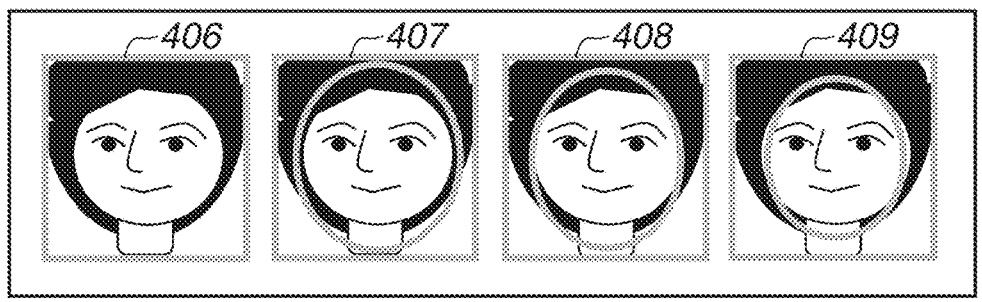
Figure 5C:
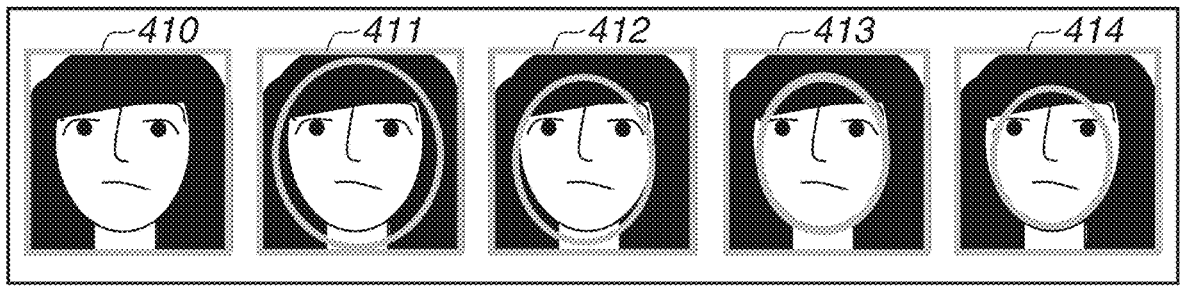

FIG. 4 is a sub-flowchart of step S206, and FIGS. 5A to 5C are diagrams illustrating an example of a process of specifying a skin color threshold value.

In step S301, the skin color threshold value specifying unit 103 sets a frame corresponding to the face region to the input image based on the face detected by the face detection unit 102. While the face detected by the face detection unit 102 is rectangular, an ellipse frame is set as a frame corresponding to the face region in the present embodiment. Specifically, an initial setting of a face frame ellipse is set. For example, an image 401 in FIG. 5A is an image (input image) acquired by the image acquisition unit 101, and tracking results 402 and 403 are results of face tracking. Further, face detection frames 404 and 405 (rectangular bounding boxes) are face frames detected by the face detection unit 102. In this example, a face detection frame is often detected as being smaller than an entire face, so that the face detection frame needs to be enlarged to include the entire face. Frames that are 1.5 times larger than the face detection frames 404 and 405 are set as illustrated as frames 406 and 410 in FIGS. 5B and 5C. In a case where an identifier of the face detection unit 102 is trained to detect a larger face detection frame like the face detection frame 406, the enlargement/reduction of a face detection frame is adjusted correspondingly to the tendency of the detection frame. Next, an ellipse with a predetermined ratio is initially placed in the face detection frame. The ellipse is set to be larger than the face detection frame and to include the face detection frame. In this example, an ellipse with an ellipse ratio of 0.85 (height 1, width 0.85) of the enlarged face frame is set as a first face frame ellipse. Ellipses 407 and 411 in FIGS. 5B and 5C are examples thereof. This first ellipse ratio is specified in advance by checking a tendency of the size of face detection.

In step S302, the skin color threshold value specifying unit 103 acquires hue (H) saturation (S) brightness (V) color information from red (R) green (G) blue (B) values of all pixels in the set face frame ellipse. Since methods for converting RGB into HSV are known, descriptions thereof are omitted. Next, in step S303, the skin color threshold value specifying unit 103 calculates a mean and a standard deviation of each of HSV.

In step S304, the skin color threshold value specifying unit 103 determines whether the standard deviation of H is less than or equal to a target value. In step S305, the skin color threshold value specifying unit 103 determines whether the standard deviation of V is less than or equal to a target value. In a case where the standard deviation of H is greater than the target value (NO in step S304) or the standard deviation of V is greater than the target value (NO in step S305), the processing proceeds to step S308. In step S308, the face frame ellipse is reduced, and the processing proceeds to step S303. In step S303, a mean and a standard deviation of each of HSV of pixels in the reduced face frame ellipse are calculated. Since the HSV values of all the pixels in the first face frame ellipse are previously calculated, re-calculation is unnecessary. Face frame ellipses 408, 409, and 412 to 414 in FIGS. 5B and 5C are examples of reduced face frame ellipses. In reducing an ellipse, the height can be reduced at a ratio of ½ of the width. With an ellipse ratio of 0.85, the height is 1 and the width is 0.85, whereas with an ellipse ratio of 0.80, the height is 0.975 and the width is 0.80.

In a case where the respective standard deviations of H and V are less than or equal to the target values, the processing proceeds to step S306. In step S306, the skin color threshold value specifying unit 103 sets threshold values (ranges) for H and S. As for the threshold value, the mean value is used as a central value, and a value obtained by multiplying the standard deviation by a predetermined multiple A is used. The obtained value is subtracted from the mean value to obtain a value, and this value is set as a lower limit threshold value (minimum value of the range). Further, the obtained value is added to the mean value to obtain a value, and this value is set as an upper limit threshold value (maximum value of the range). In specifying a threshold value for S, the range can be specified using another predetermined multiple A2 different from the predetermined multiple A for H.

In step S307, the skin color threshold value specifying unit 103 specifies a threshold value for V. The threshold value can be specified using a method similar to the methods used for H and S, but the standard deviation of V in face images is often greater than the standard deviations of H and S, so that a range specified using a multiple that is the same as the multiple for H or S is often wide. A preset fixed value is used in a case where the mean value of the brightness V is within a range between a first predetermined value indicating a lower limit of the target value and a second predetermined value indicating an upper limit of the target value. In a case where the mean value is less than the first predetermined value, a threshold value is specified based on a statistical value. Specifically, a value obtained by multiplying the standard deviation by a predetermined multiple B is subtracted from the mean value to obtain a value, and this value is specified as the lower limit threshold value. The upper limit threshold value remains fixed. Further, in a case where the mean value of V is greater than the second predetermined value, a threshold value is specified based on a statistical value. Specifically, a value obtained by multiplying the standard deviation by the predetermined multiple B is subtracted from the mean value to obtain a value, and this value is specified as the lower limit threshold value. Further, a value obtained by multiplying the standard deviation by a predetermined multiple C is added to the mean value to obtain a value, and this value is specified as the upper limit threshold value. The predetermined multiples A, B, and C are empirically obtained multiples.

Whether the standard deviation of H is less than or equal to the target value is determined in step S304 and whether the standard deviation of V is less than or equal to the target value is determined in step S305, and in a case where one of the standard deviations of H and V becomes less than or equal to the target value first, the mean values and the standard deviations at this point can be retained for use in specifying the threshold values. While whether the standard deviation of H is less than or equal to the target value is determined in step S304 and whether the standard deviation of V is less than or equal to the target value is determined in step S305, a separate target value can also be set for S, and whether the standard deviation of S is less than or equal to the target value can be determined.

FIG. 6 illustrates an example of ellipse ratios and mean values and standard deviations of HSV in a case where a face frame ellipse is reduced. In a case where a standard deviation becomes less than or equal to a target value, an upper limit value and a lower limit value are obtained, and a threshold value is set for each tracking. In this example, the predetermined multiples A, B, and C are 2.0, 0.6, and 2.0, respectively. The ellipse ratio can be reduced at regular intervals. The reduction rate of the face frame ellipse can be increased at a predetermined rate. Further, a magnitude of the change of the reduction rate can be increased in a case where the standard deviation is far from the target value, and the magnitude can be reduced as the standard deviation becomes closer to the target value.

As described above, since a skin color threshold value is specified for each person or each imaging environment, a pulse is estimated with great accuracy from an image even in a situation where an imaging condition is inconstant.

According to the first embodiment, the mean values and the standard deviations of all the pixels in the ellipse are calculated in step S206. In this case, in a case where front hair covers the face or an accessory such as glasses or a face mask is worn, a color other than the skin color is mixed in the face frame ellipse, and the color information may not reach the target values. In this case, the shape of the ellipse can be replaced, and then mean values and standard deviations of the color information can be calculated.

Figure 7:
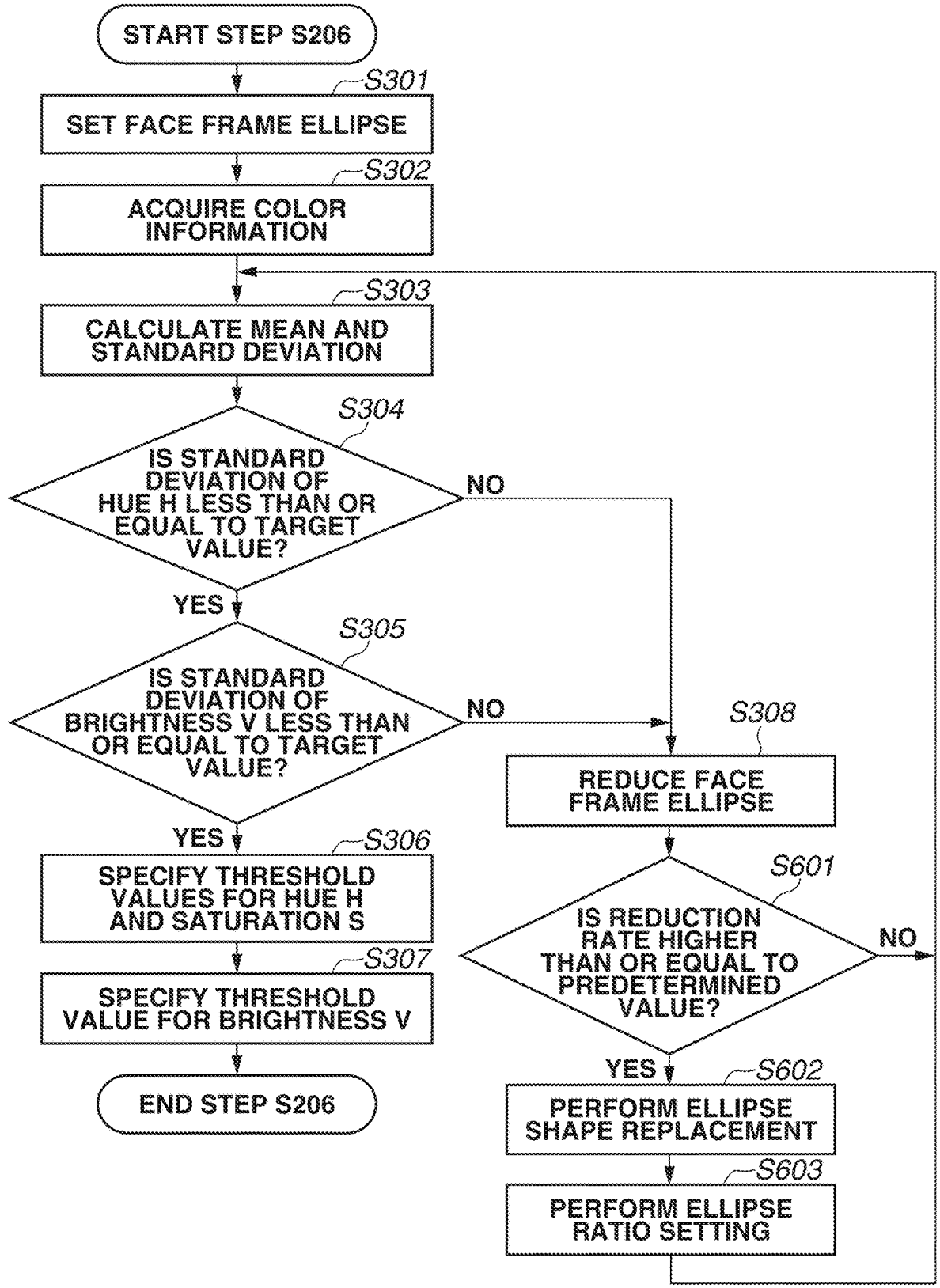
FIG. 7 is a flowchart illustrating a process that is performed by the image processing apparatus.

FIG. 7 is a flowchart illustrating a process that is performed by the image processing apparatus 1 in a case where the shape of the face frame ellipse is to be replaced in step S206. Steps S301 to S308 are similar to those in FIG. 4, so that redundant descriptions thereof are omitted.

Figure 8:
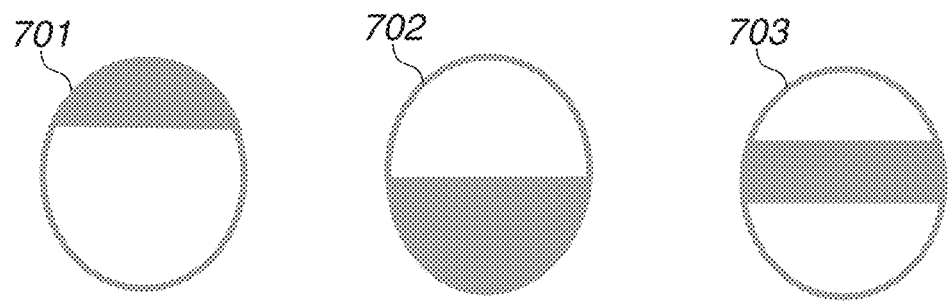
FIG. 8 is a diagram illustrating an example of variations.

In step S601, the skin color threshold value specifying unit 103 determines whether the ellipse ratio is lower than or equal to a predetermined value (whether the reduction rate is higher than or equal to a predetermined value). In a case where the ellipse ratio is lower than or equal to the predetermined value (YES in step S601), the processing proceeds to step S602. In step S602, the ellipse shape replacement is performed. FIG. 8 illustrates ellipse shapes 701 to 703 as replacement candidates. Each pixel of a gray portion is excluded from targets for which a mean and a standard deviation are to be calculated. The ellipse shape 701 is with front hair thereon. The ellipse shape 702 is with a face mask thereon. The ellipse shape 703 is with sunglasses thereon. A combination thereof can be generated. A shape to be changed is selected as desired, and in a case where the ellipse ratio becomes less than or equal to the predetermined value using the shape, a deformed region having another shape is set to the ellipse region. In step S603, the skin color threshold value specifying unit 103 performs ellipse ratio setting and changes the ellipse ratio to the initial ellipse ratio, and the processing proceeds to step S303 to repeat the process.

Further, an accessory detection unit can be used in combination to complement the face detection. In this case, a corresponding ellipse shape is selected from the beginning. For example, while detecting a face, the face detection unit 102 detects particular objects such as an accessory (mask, glasses, sunglasses) and front hair using a detector configured to detect an object covering a face. In a case where a particular object is detected, the skin color threshold value specifying unit 103 sets a deformed region corresponding to the particular object.

As described above, in a case where there is an accessory covering a skin color region of a face, the shape of a face frame ellipse to be set is replaced with another shape. This reduces colors other than the skin color, and a skin color region is set. Thus, a skin color threshold value is set with ease, and the accuracy of pulse estimation increases.

In a case where a background color is similar to the skin color and is within a range of color information defined as the skin color, if a skin color region is detected using a specified threshold value, a mean hue value may be calculated including the background. In this case, the accuracy of pulse estimation may decrease. Thus, in specifying a skin color threshold value, a level of mixing with the background color is checked, and a background mask for excluding the background region in a case where mixing occurs is generated to exclude the background region from the skin color region detection targets thereafter.

Figure 9:
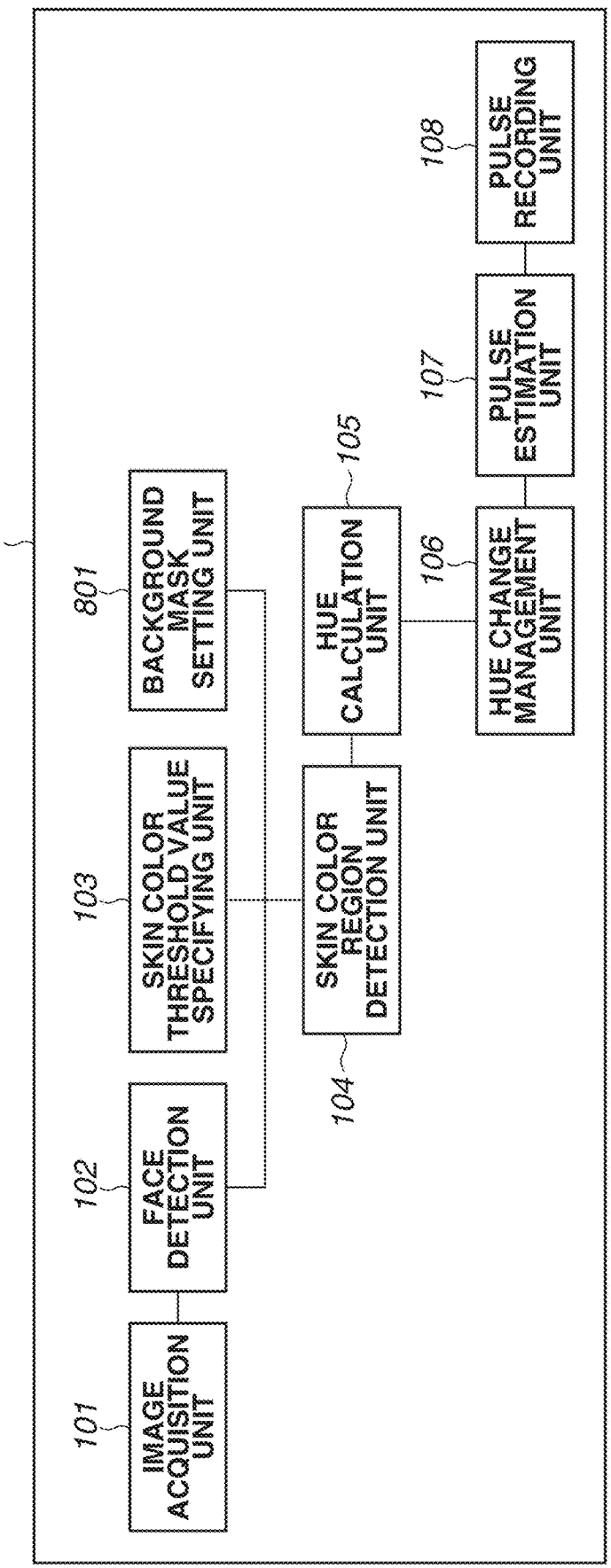
FIG. 9 is a block diagram illustrating an example of a functional configuration of the image processing apparatus.

FIG. 9 is a block diagram illustrating the image processing apparatus 1 configured to perform a process of masking a background region. The components 101 to 108 are similar to those of the image processing apparatus 1 in FIG. 1, so that redundant descriptions thereof are omitted. A background mask setting unit 801 sets a mask to a background region using a histogram based on color information in an image.

Figure 10:
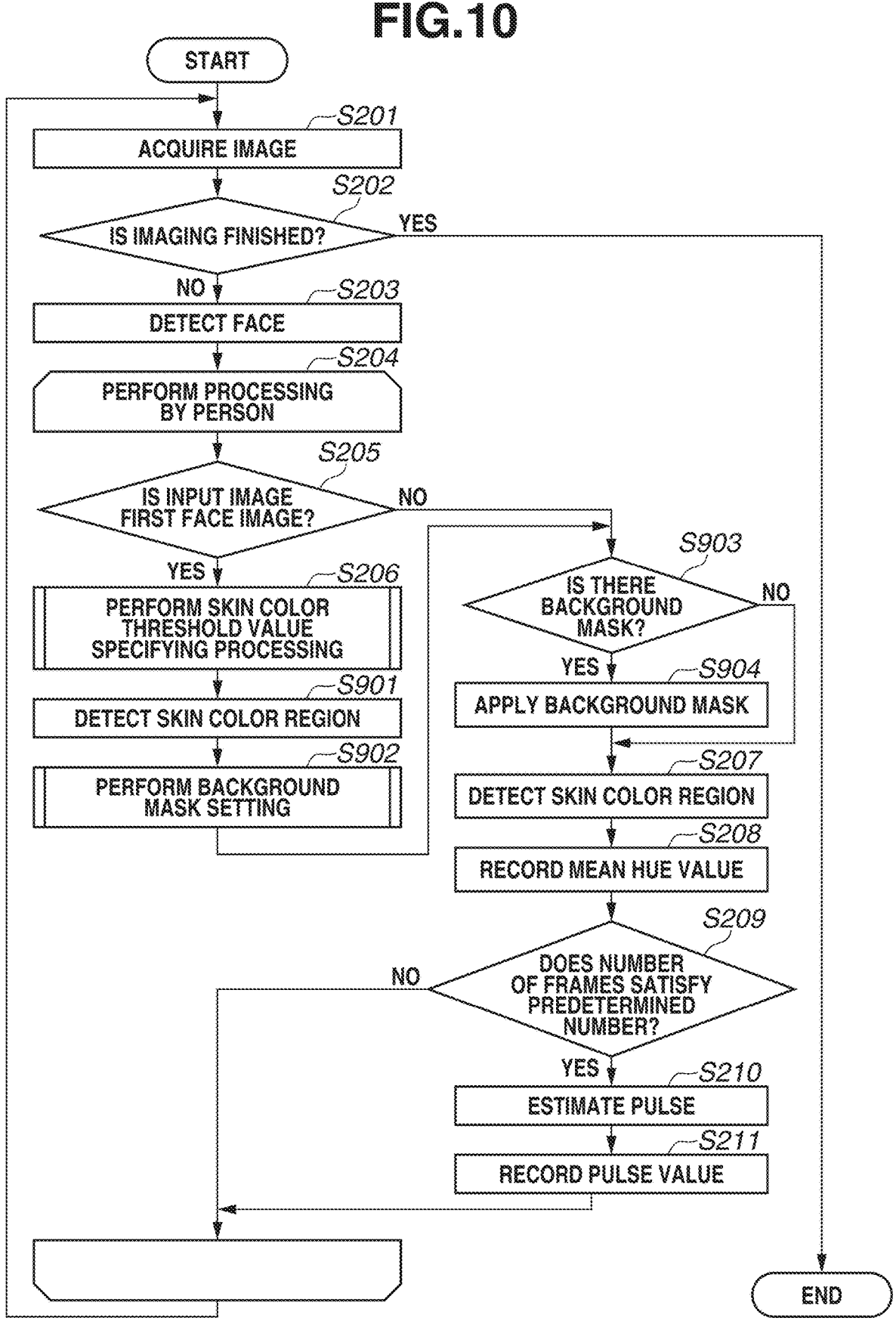
FIG. 10 is a flowchart illustrating a process that is performed by the image processing apparatus.

FIG. 10 is a flowchart illustrating a process that is performed by the image processing apparatus 1. Steps S201 to S211 are similar to those in FIG. 2, so that redundant descriptions thereof are omitted. In step S901, the skin color region detection unit 104 performs skin color region detection using the specified skin color threshold value. In step S902, the background mask setting unit 801 performs background mask setting. The background mask can be set in a case where mixing of the background color and the skin color of the face occurs, or the background mask can be set even in a case where no mixing of the background and the face occurs. Details of the processing of step S902 will be described below.

In step S903, the skin color region detection unit 104 determines whether there is a set background mask. In a case where there is a background mask (YES in step S903), the processing proceeds to step S904. In step S904, the background mask is applied to pixels in the face frame to exclude the masked pixels from the skin color region detection targets, and the processing proceeds to step S208. Specifically, the skin color region detection unit 104 extracts a skin color region from the region outside the background mask. On the other hand, in a case where there is not a background mask (NO in step S903), the processing proceeds directly to step S208.

Figure 12:
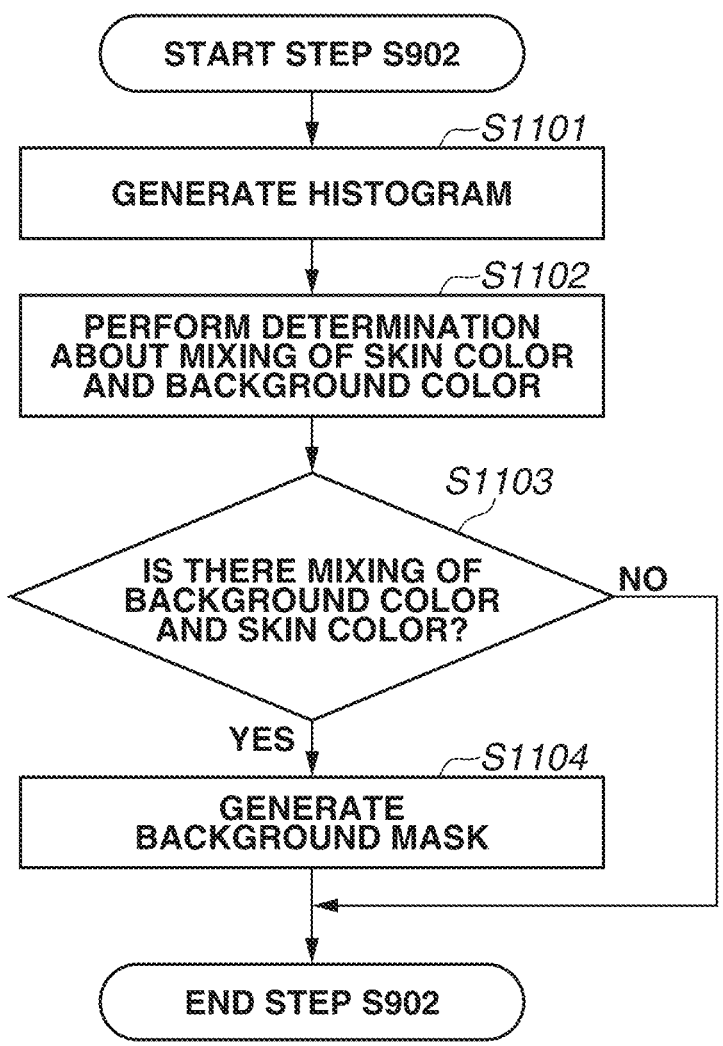
FIG. 12 is a flowchart illustrating a process that is performed by the image processing apparatus.

FIG. 11 is a diagram illustrating an example of a background mask. FIG. 12 is a flowchart illustrating the background mask setting processing (step S902). A face image 1001 in FIG. 11 is an example of a case where a background and a skin color of a face are similar to each other.

In step S1101 in FIG. 12, the background mask setting unit 801 generates a histogram indicating a distribution of the number of skin color pixels in a horizontal direction of the image. A histogram 1002 in FIG. 11 is an example of a generated histogram. An x-axis shows pixel positions in the horizontal direction of the image, and a y-axis shows the number of skin color pixels on each X-coordinate. Portions 1003 and 1004 having dropped y-values near respective ends are considered to indicate x-coordinates of the outside of the face. In step S1102, the background mask setting unit 801 determines whether there is mixing of the background color and a face color based on the generated histogram. For example, in a case where the histogram shape has a y-value increased outside the positions of valleys on the respective sides, it is determined that there is mixing of the background color and the skin color. Two points having a smaller number of pixels than a predetermined value can be selected as end points of the face, or a search for endpoints that are local minimum points can be performed based on a gradient of the curved line. In the determination about mixing, specifically, the left half of the face and the background color may be similar to each other in a case where the number of pixels in a range where each X-coordinate is less than the left endpoint is greater by a predetermined amount than the number of pixels of the endpoint or in a case where the gradient is a negative value. Similarly, the number of pixels in a range where each X-coordinate is greater than the right endpoint is compared, and in a case where the gradient of the line graph in the range is a positive value, it is determined that the right endpoint is an end of the face and is mixed with the background as the same type of color.

Whether a boundary between the face and the background is visible can be determined using any other methods.

In step S1103, in a case where the background mask setting unit 801 determines that there is mixing of the background color and the skin color (YES in step S1103), the processing proceeds to step S1104. In step S1104, the background mask setting unit 801 generates a background mask. On the other hand, in a case where the background mask setting unit 801 determines that there is no mixing of the background color and the skin color (NO in step S1103), no background mask is generated, and the processing of step S902 ends.

The background mask is an ellipse region to exclude the portions having the dropped y-values near the respective ends. Specifically, the width of the background mask is specified based on the histogram. The shape of the background mask is not limited to the ellipse and can be a shape illustrated in FIG. 8. A background mask 1005 in FIG. 11 is a generated background mask, and a face image 1006 in FIG. 11 is a face image to which the background mask is applied and which is generated through the background mask generation processing of step S904 in FIG. 9. The shape of the background mask is not limited to the ellipse, and the background mask can have a shape to exclude both sides such as a background mask 1007 in FIG. 11.

In a case where various objects are captured in the background and the background is partially mixed with the skin color of the face, a histogram 1007 as illustrated in FIG. 11 is generated. There are portions determined as the skin color on both sides of valleys 1008 and 1009 at respective sides. In this case, it is determined that there is mixing of the background color and the skin color. Further, a background mask generated to have a fixed size cannot be used in a case where the size of the face detection frame is changed. Thus, the valley positions are recorded as a ratio to an entire size, and an ellipse having the ratio can be re-generated as a background mask correspondingly to the size of the face thereafter.

In a case where, for example, a person moves and the background changes, the background mask application determination can be performed on all frames. In this case, the determination about mixing of the background color and the face color is performed each time on the frames for pulse estimation as well as in setting a skin color threshold value. Specifically, the determination about mixing in step S1103 is performed after the skin color region detection, and whether to generate a background mask is determined. This processing is performed so that a pulse can still be estimated from images even in a case where an environment is changed.

According to the first embodiment, the statistical values are calculated until the standard deviations of the hue H and the brightness V become less than or equal to the target values, and the threshold value for the skin color range is specified based on the mean values and the standard deviations. There may be, however, a case where the standard deviation of the saturation S remains great although the standard deviations of H and V become the target values. In this case, a threshold value specified by adding or subtracting a value obtained by multiplying the standard deviation of S by a predetermined multiple to or from the mean value of S may exceed the highest or lowest possible value of S. This occurs due to an effect of the camera type, auto white balance, illumination color, or background color.

At this time, even if a threshold value is set within the highest and lowest values of S, the range of the threshold value for S becomes excessively wide, and even a background portion may be determined as a skin portion. In a case where the standard deviation of S becomes excessively great and the range of the threshold value becomes excessively wide, an upper limit margin value obtained by adding a margin to the highest value and a lower limit margin value obtained by adding the margin to the lowest value can be set as limits.

Figure 13:
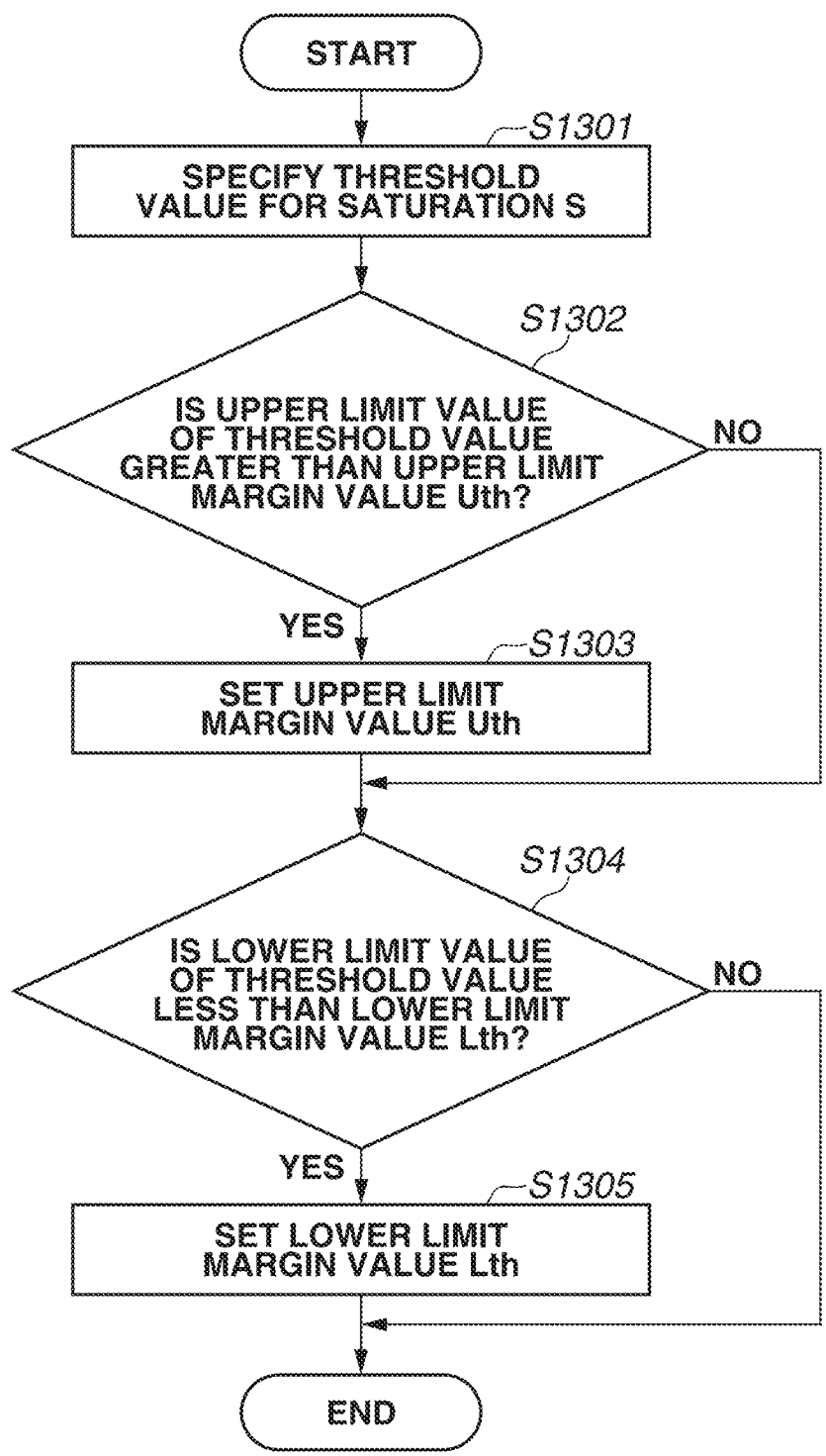
FIG. 13 is a flowchart illustrating a process that is performed by the image processing apparatus.

FIG. 13 is a flowchart illustrating a process that is performed by the image processing apparatus 1. This process relates to the specifying of S during the processing of specifying threshold values for H and S in step S306 in FIG. 4.

FIGS. 14B to 14D illustrate an example of the process.

In step S1301, the skin color threshold value specifying unit 103 specifies a threshold value for the saturation S using the mean value and the standard deviation of the saturation S. Specifically, the lower limit threshold value (the minimum value of the range) is the value obtained by subtracting the value obtained by multiplying the standard deviation of the saturation S by the predetermined multiple A from the mean value of the saturation S. Further, the upper limit threshold value (the maximum value of the range) is the value obtained by adding the value obtained by multiplying the standard deviation of the saturation S by the predetermined multiple A to the mean value of the saturation S. FIG. 14A illustrates an example of skin color threshold values obtained from an image illustrated in FIG. 14B. This is an example of a calculation where the predetermined multiple A is 2.0, and a lower limit value 1401 of the saturation S is −6. The settings of the highest and lowest possible values of the saturation S vary depending on a calculation method. In this example, the highest and lowest possible values are set to 0 and 255, resulting in exceeding the lowest possible value. FIG. 14C is a diagram illustrating the skin color displayed in white and colors other than the skin color in black in a case where the values are directly set as the threshold values or values limited to the possible values of 0 to 255 are set as the threshold values. White regions determined as the skin color spread over the background portion.

In step S1302, the skin color threshold value specifying unit 103 determines whether the upper limit value of the specified threshold value for the saturation S is greater than an upper limit margin value Uth. For example, For example, a value that is 75% of the difference between the upper limit of 255 of the possible values of the saturation S and the mean value of S is added to the mean value of S to obtain a value, and this value is set as the upper limit margin value Uth.

In a case where the upper limit value of the threshold value for the saturation S is greater than the upper limit margin value Uth (YES in step S1302), the processing proceeds to step S1303. In step S1303, the upper limit margin value Uth is set as the upper limit value of the threshold value for the saturation S. On the other hand, in a case where the upper limit value of the threshold value for the saturation S is less than the upper limit margin value Uth (NO in step S1302), the upper limit value specified in step S1301 is held.

In step S1304, the skin color threshold value specifying unit 103 determines whether the lower limit value of the threshold value specified in step S1301 is less than a lower limit margin value Lth. For example, a value that is 25% of the mean value is set as the lower limit margin value Lth. In a case where the lower limit value of the threshold value specified in step S1301 is less than the lower limit margin value Lth (YES in step S1304), the processing proceeds to step S1305. In step S1305, the lower limit margin value Lth is set as the lower limit value of the threshold value for the saturation S. On the other hand, in a case where the lower limit value of the threshold value specified in step S1301 is greater than the lower limit margin value Lth (NO in step S1304), the lower limit value specified in step S1301 is held. FIG. 14D illustrates an example of a case where the threshold value for the saturation S is limited to the lower limit margin value Lth. The white portions determined as the skin color no longer appear in the background portion. While the margin is calculated based on the mean value in this example, the margin can be a fixed value or can be calculated using the mean value and the standard deviation.

According to the second embodiment, the shape of the ellipse is changed based on an assumption that an accessory such as glasses or a face mask may be worn in a case where the standard deviation does not reach the target value. However, there are cases where the standard deviation of the hue H does not reach the target due to an effect of the camera type, auto white balance, illumination color, or background color although no accessories are worn. With a threshold value specified using the standard deviation that does not reach the target, a region determined as the skin color expands, and a portion determined as the skin color may appear in the background.

According to the third embodiment, the background mask is applied in a case where a portion determined as the skin color appears in the background.

The background mask is designed to exclude the portions other than the face portion but is not designed to reflect an accurate shape of the face, so that the background portion may be included or the face portion may be excluded. A threshold value for distinguishing between the skin and the background color is more desirable if the threshold value is obtainable.

The skin color threshold value specifying unit 103 can therefore specify a provisional threshold value, check a skin color content percentage of a region outside an ellipse where a face is expected to be present and a skin color content percentage of a region inside the ellipse, and correct the skin color threshold value based on the skin color content percentages of the regions outside and inside the ellipse. In a case where the content percentage of the region outside the ellipse is higher than or equal to a predetermined value, the provisional threshold value is changed by reducing the value of the standard deviation that determines the range of the threshold value. In a case where the skin color content percentage of the region inside the ellipse becomes excessively low, the provisional threshold value is changed to a previous threshold value.

Figure 15:
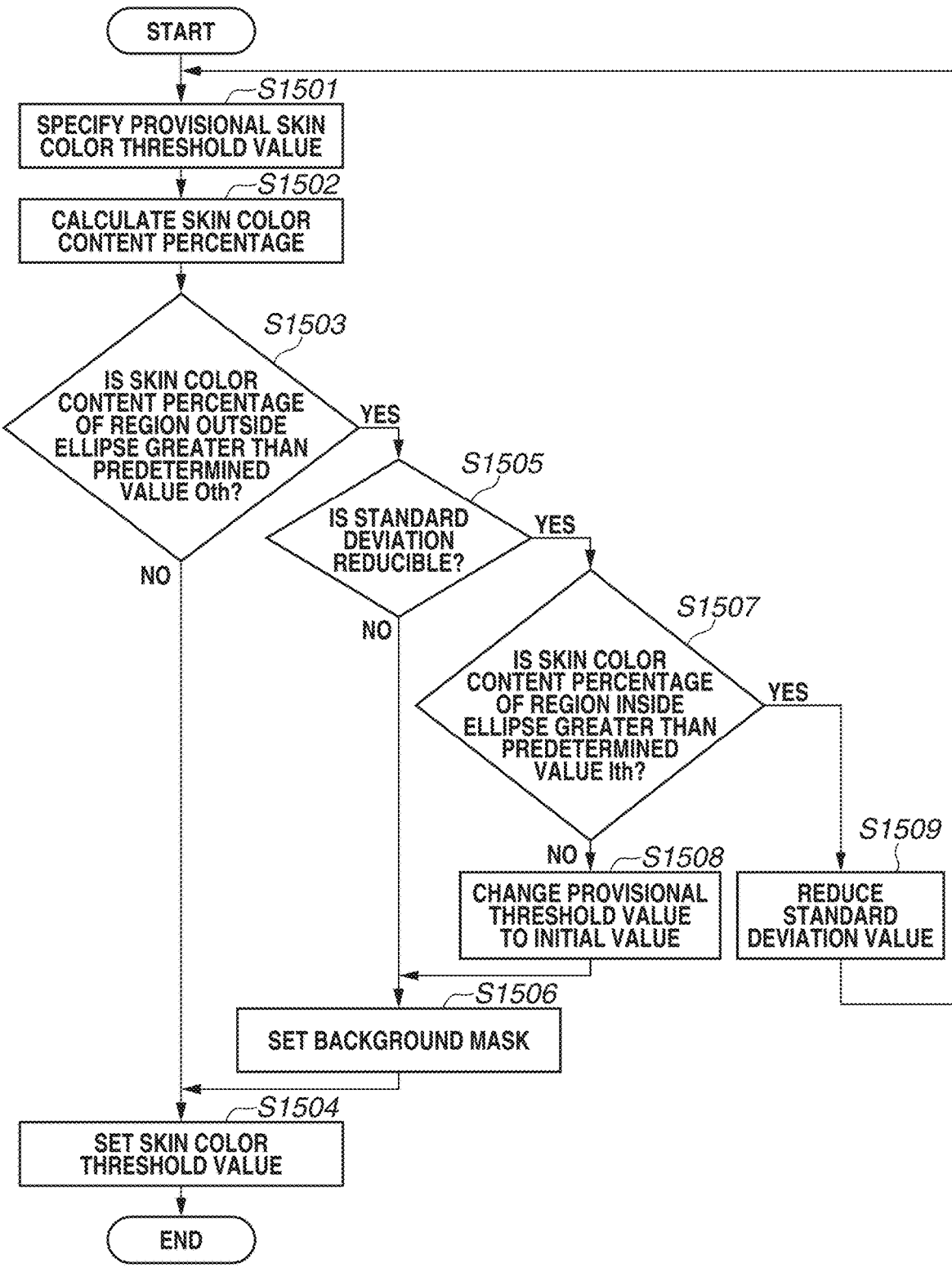
FIG. 15 is a flowchart illustrating a process that is performed by the image processing apparatus.

FIG. 15 is a flowchart illustrating a process that is performed by the image processing apparatus 1. The threshold value correction processing can be performed as post-processing after a threshold value is specified after the processing of step S307 in the flowchart in FIG. 4 or can be performed as a process after step S601 in FIG. 7 in a case where the standard deviation does not reach the target value. In a case where the threshold value correction processing is placed after step S601, the process ends after the threshold value correction processing is performed.

FIGS. 16A to 16F illustrate an example of the process.

In step S1501, the skin color threshold value specifying unit 103 specifies a provisional skin color threshold value. The provisional skin color threshold value is specified using a method similar to the skin color threshold value specifying method in the flowchart in FIG. 4. FIG. 16A illustrates an example of threshold values specified using an image illustrated in FIG. 16B. A standard deviation 1601 of the hue H is greater than the target value. A standard deviation 1602 of the saturation S is slightly greater. In this example, the target value for the hue H is 12, and the target value for the saturation S is 20.

In step S1502, the skin color region detection unit 104 calculates a skin color content percentage of a region inside an ellipse indicating a face and a skin color content percentage of a region outside the ellipse using the specified threshold value. FIG. 16C is a diagram displaying portions determined as the skin color in white and displaying portions other than the skin color in black. FIG. 16D is a diagram illustrating an ellipse 1608 placed to separate inside and outside portions from each other. The ellipse 1608 at this time is not an ellipse narrowed and reduced to specify a threshold value but an ellipse that is initially used in specifying a threshold value.

In step S1503, the skin color region detection unit 104 determines whether the skin color content percentage of the region outside the ellipse is greater than a predetermined value Oth. In this example, the predetermined value Oth is 10%. In a case where the skin color content percentage of the region outside the ellipse is less than the predetermined value Oth (NO in step S1503), the processing proceeds to step S1504. In step S1504, the provisional threshold value is set as the skin color threshold value.

In FIG. 16A, a skin color content percentage 1603 of the region outside the ellipse is 40%, which is greater than the predetermined value Oth. In a case where the skin color content percentage of the region outside the ellipse is greater than the predetermined value Oth (YES in step S1503), the processing proceeds to step S1505. In step S1505, the skin color threshold value specifying unit 103 determines whether the value of the standard deviation specifying the range of the threshold value is reducible. According to the present embodiment, the value of the standard deviation of the hue H is used to specify the range of the threshold value. From the moment of being reduced, the value no longer has a meaning as a statistical value, but the term "standard deviation" will be used for convenience. Further, in this example, a reducible value is a value that is 1.2 times the target value or greater, and the value can be reduced only once and cannot be reduced to a value less than the value that is 1.2 times the target value. In a case where the value of the standard deviation specifying the range of the threshold value is reducible (YES in step S1505), the processing proceeds to step S1507. In step S1507, whether the skin color content percentage of the region inside the ellipse is greater than a predetermined value Ith is determined. In this example, the predetermined value Ith is 50%. In FIG. 16A, the value of the standard deviation of the hue H is reducible, and a skin color content percentage 1604 of the region inside the ellipse is 64%, which is higher than the predetermined value Ith. In step S1509, the value of the standard deviation is reduced, and the processing returns to step S1501 to repeat the process. Values 1605 and 1606 in FIG. 16A are reduced values. The reduction can be repeated again and again starting with a greater multiple.

FIGS. 16E and 16F illustrate an example where a skin color threshold value is calculated using the reduced standard deviation and a skin color content percentage is checked again in step S1502. A skin color content percentage 1607 of a region outside an ellipse 1609 is 6%, which is less than the predetermined value Oth, so that in step S1504, the skin color threshold value specifying unit 103 sets a threshold value, and the process ends.

FIGS. 17A to 17G illustrate examples where the background and the skin color are indistinguishable within the reducible range. FIG. 17A illustrates an example of threshold values specified using an image illustrated in FIG. 17B. Values 1701 and 1702 in FIG. 17A are both great value. FIGS. 17C and 17D are diagrams displaying portions determined as the skin color in white and displaying portions other than the skin color in black. Skin color content percentages of inside and outside regions of an ellipse 1707 are calculated, and a skin color content percentage 1703 of the region outside the ellipse is 50%. FIGS. 17E and 17F illustrate a distribution of portions determined as the skin as a result of reducing the standard deviations to values 1704 and 1705 and correcting the threshold value. Skin color content percentages of regions inside and outside an ellipse 1708 in FIG. 17F are calculated, and a skin color content percentage 1706 of the region outside the ellipse is 32%, which is higher than the predetermined value Oth. While the reducibility is checked in step S1505, since the reduction to the value that is 1.2 times the target value is finished, further reduction cannot be conducted. The processing proceeds to step S1506. In step S1506, a background mask to exclude the region outside the ellipse from the pulse estimation range is set, and the processing proceeds to step S1504. In step S1504, the provisional threshold value is set as a skin color threshold value.

A background mask 1709 in FIG. 17G is an example of a background mask.

FIGS. 18A to 18G illustrate an example where an increase of regions determined as not being the skin color in the face due to an excessively narrowed range of skin color as a result of reducing the standard deviations is prevented. A skin color threshold value is calculated from an image illustrated in FIG. 18B. Values 1801 and 1802 in FIG. 18A are slightly great. FIGS. 18C and 18D are diagrams displaying portions determined as the skin color in white and displaying portions other than the skin color in black. As illustrated in FIG. 18C, the background includes some regions determined as the skin color. A skin color content percentage 1803 of a region outside an ellipse 1809 in FIG. 18D is 12%, which is slightly higher than the predetermined value Oth. The standard deviations are reduced to values 1807 and 1808, and a skin color is obtained. FIGS. 18E and 18F illustrate a distribution of portions determined as the skin as a result of correcting the threshold value. As illustrated in FIG. 18E, while regions determined as the skin color in the background are decreased, regions that are not the skin color in the face are increased. A skin color content percentage 1806 of a region inside an ellipse 1810 in FIG. 18F is 47%, which is less than the predetermined value Ith.

In step S1507, in a case where the skin color threshold value specifying unit 103 determines that the skin color content percentage of the region inside the ellipse is less than the predetermined value Ith (NO in step S1507), the processing proceeds to step S1508. In step S1508, the provisional threshold value is changed to the initial value. The values 1807 and 1808 in FIG. 18A are the same as the values 1801 and 1802. Next, the processing proceeds to step S1506. In step S1506, a background mask to exclude the region outside the ellipse from the pulse estimation range is set. The background mask is a background mask 1811 in FIG. 18G. Next, in step S1504, the provisional threshold value is set as a skin color threshold value. In a case where the processing proceeds to step S1508 without proceeding through the standard deviation reducing process, the skin color threshold value specifying unit 103 does not change the provisional threshold value.

While the ellipses are used to check the skin color content percentages of the face and the background portion, a rectangular region corresponding to a neck position can be added to the bottom of each ellipse, and the added region can also be measured as the region inside the ellipse.

(Other Embodiments)

The present invention is also realized by performing the following process. Specifically, software (program) for realizing the functions of the above-described embodiments is fed to a system or a device via a network for data communication or various storage mediums. Then, a computer (or a CPU or a micro-processing unit (MPU)) of the system or the device reads the program and executes the read program.

Further, the program can be recorded on a computer-readable recording medium, and the recording medium storing the program can be provided.

A model trained by machine learning can be used in processing in place of the face detection unit 102 among the above-described processing units. In this case, for example, a plurality of combinations of input data to the processing unit and output data is prepared as training data, and knowledge is acquired from the combinations through machine learning. Then, a trained model configured to output the output data corresponding to the input data as a result is generated based on the acquired knowledge. The trained model can consist of, for example, a neural network model. Then, the trained model performs the processing of the processing unit by operating as a program for performing processing equivalent to that of the processing unit in cooperation with a CPU or a graphics processing unit (GPU). The trained model can be updated as needed after predetermined processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Applications No. 2021-053208, filed Mar. 26, 2021, and No. 2021-152320, filed Sep. 17, 2021, which are hereby incorporated by reference herein in their entirety.

What is claimed is:

1. An image processing apparatus configured to estimate a pulse of a person detected from an image, the image processing apparatus comprising:
   One or more memories storing instructions; and
   One or more processors that, upon execution of the stored instructions, are configured to
   set, within each acquired image frame captured by an imaging apparatus, a region including a face detected from the captured image frame, the region including a plurality of pixels and being of a first size;
   acquire color information about each pixel included in the set region of the first size;
   determine, for one of the acquired image frames, whether each component of the acquired color information of all pixels satisfies a predetermined value associated with each respective component of color information; and
   reduce a size of the set region by a predetermined reduction ratio in response to at least one component of the acquired color information until all of the color components satisfy the predetermined value;
   specify a skin color threshold value indicating a skin color range based on the color information in the region in response to determining that the acquired color information satisfies the predetermined value;
   extract, from each of the acquired image frames other than the one of the acquired image frames using the specified skin color threshold value, pixel values corresponding to skin color; and
   estimate a pulse of the person in the image based on a change in color of the extracted pixel values over a series of image frames.

2. The image processing apparatus according to claim 1, wherein the components of the color information includes hue, saturation, and brightness, and
   wherein execution of the stored instructions further configures the one or more processors to acquire a statistical value of the hue of the pixel included in the region and a statistical value of the brightness of the pixel included in the region.

3. The image processing apparatus according to claim 2, wherein execution of the stored instructions further configures the one or more processors to determine, as the predetermined value, whether the statistical value of the hue of the pixel included in the region satisfies a target value and whether the statistical value of the brightness of the pixel included in the region satisfies a target value, and
   wherein in a case where the statistical value of the hue of the pixel included in the region satisfies the target value and the statistical value of the brightness of the pixel included in the region satisfies the target value, specify the skin color threshold value based on the color information in the region.

4. The image processing apparatus according to claim 3, wherein execution of the stored instructions further configures the one or more processors to specify the skin color threshold value based on the statistical value of the hue and a statistical value of the saturation or based on a preset fixed value.

5. The image processing apparatus according to claim 4, wherein the statistical value is a standard deviation and a mean value of the color information, and
   wherein execution of the stored instructions further configures the one or more processors to specify the threshold value based on the standard deviation of the hue and the standard deviation of the saturation.

6. The image processing apparatus according to claim 5, wherein execution of the stored instructions further configures the one or more processors to specify a value obtained by adding or subtracting a predetermined value to or from the mean value of the saturation as a threshold value for the saturation among the specified skin color threshold value for the skin color.

7. The image processing apparatus according to claim 5, wherein execution of the stored instructions further configures the one or more processors to use a preset fixed value in a case where the mean value of the brightness is within a range from a first predetermined value indicating a lower limit of the target value to a second predetermined value indicating an upper limit of the target value, and
specify the skin color threshold value based on the statistical value in a case where the mean value of the brightness is less than the first predetermined value or greater than the second predetermined value.

8. The image processing apparatus according to claim 1, wherein execution of the stored instructions further configures the one or more processors to set the region in a size smaller than the first size in a case where it is determined that the color information does not satisfy the predetermined value.

9. The image processing apparatus according to claim 1, wherein execution of the stored instructions further configures the one or more processors to set a deformed region indicating a predetermined shape to the region in a case where the it is determined that the color information does not satisfy the predetermined value.

10. The image processing apparatus according to claim 9, execution of the stored instructions further configures the one or more processors to detect an object covering the face detected from the image, and
sets a different deformed region for a different detected object.

11. The image processing apparatus according to claim 10, wherein the detection of an object includes detecting front hair, glasses, and a mask.

12. The image processing apparatus according to claim 1, execution of the stored instructions further configures the one or more processors to track the face, and
estimate a pulse with respect to the tracked face.

13. The image processing apparatus according to claim 1, execution of the stored instructions further configures the one or more processors to generate a background mask with respect to each of the acquired image frame, and
extract the skin color region from a region excluded from the background mask.

14. The image processing apparatus according to claim 1, execution of the stored instructions further configures the one or more processors to update the specified skin color threshold value for the skin color based on a skin color content percentage of a sub-region inside the region or a skin color content percentage of a region outside the region, the skin color content percentages being calculated using the specified skin color threshold value for the skin color.

15. The image processing apparatus according to claim 14, wherein execution of the stored instructions further configures the one or more processors to decrease the specified skin color threshold value for the skin color in a case where it is determined that the skin color content percentage of the region outside the region is higher than a predetermined value and the skin color content percentage of the sub-region inside the region is higher than a predetermined value, whereas the specified skin color threshold value is not updated for the skin color in a case where it is determined that the skin color content percentage of the region outside the region is higher than the predetermined value and the skin color content percentage of the sub-region inside the region is lower than the predetermined value.

16. The image processing apparatus according to claim 14, wherein execution of the stored instructions further configures the one or more processors to generate a background mask with respect to each of the image frames in a case where it is determined that the skin color content percentage of the region outside the region is higher than a predetermined value.

17. The image processing apparatus according to claim 13, wherein execution of the stored instructions further configures the one or more processors to generate a histogram indicating the number of pixels included in the specified skin color threshold value based on the color information about the pixel included in the region and generates the background mask based on the histogram.

18. An image processing method for estimating a pulse of a person detected from an image, the method comprising:
setting, within each acquired image frame by an imaging apparatus, a region including a face detected from the captured image frame, the region including a plurality of pixels and being of a first size;
acquiring color information about each pixel included in the set region of the first size;
determining, for one of the acquired image frames, whether each component of the acquired color information of all pixels satisfies a predetermined value associated with each respective component of color information;
reducing a size of the set region by a predetermined reduction ratio in response to at least one component of the acquired color information until all of the color components satisfy the predetermined value
specifying a skin color threshold value indicating a skin color range based on the color information in the region in response to determining that the acquired color information satisfies the predetermined value
extracting, from each of the acquired image frames other than the one of the acquired image frames using the specified skin color threshold value, pixel values corresponding to skin color; and
estimating a pulse of the person in the image based on a change in color of the extracted pixel values over a series of image frames.

19. A non-transitory computer-readable storage medium storing a program for causing a computer to execute an image processing method for estimating a pulse of a person detected from an image, the method comprising:
setting, within each acquired image frame by an imaging apparatus, a region including a face detected from the captured image frame, the region including a plurality of pixels and being of a first size;
acquiring color information about each pixel included in the set region of the first size;
determining, for one of the acquired image frames, whether each component of the acquired color information of all pixels satisfies a predetermined value associated with each respective component of color information;
reducing a size of the set region by a predetermined reduction ratio in response to at least one component of the acquired color information until all of the color components satisfy the predetermined value specifying a skin color threshold value indicating a skin color range based on the color information in the region in response to determining that the acquired color information satisfies the predetermined value extracting, from each of the acquired image frames other than the one of the acquired image frames using the specified skin color threshold value, pixel values corresponding to skin color; and estimating a pulse of the person in the image based on a change in color of the extracted pixel values over a series of image frames.

* * * * *